No. 882,905.
PATENTED MAR. 24, 1908.
E. A. MARSH.
PNEUMATIC TIRE.
APPLICATION FILED NOV. 7, 1906.
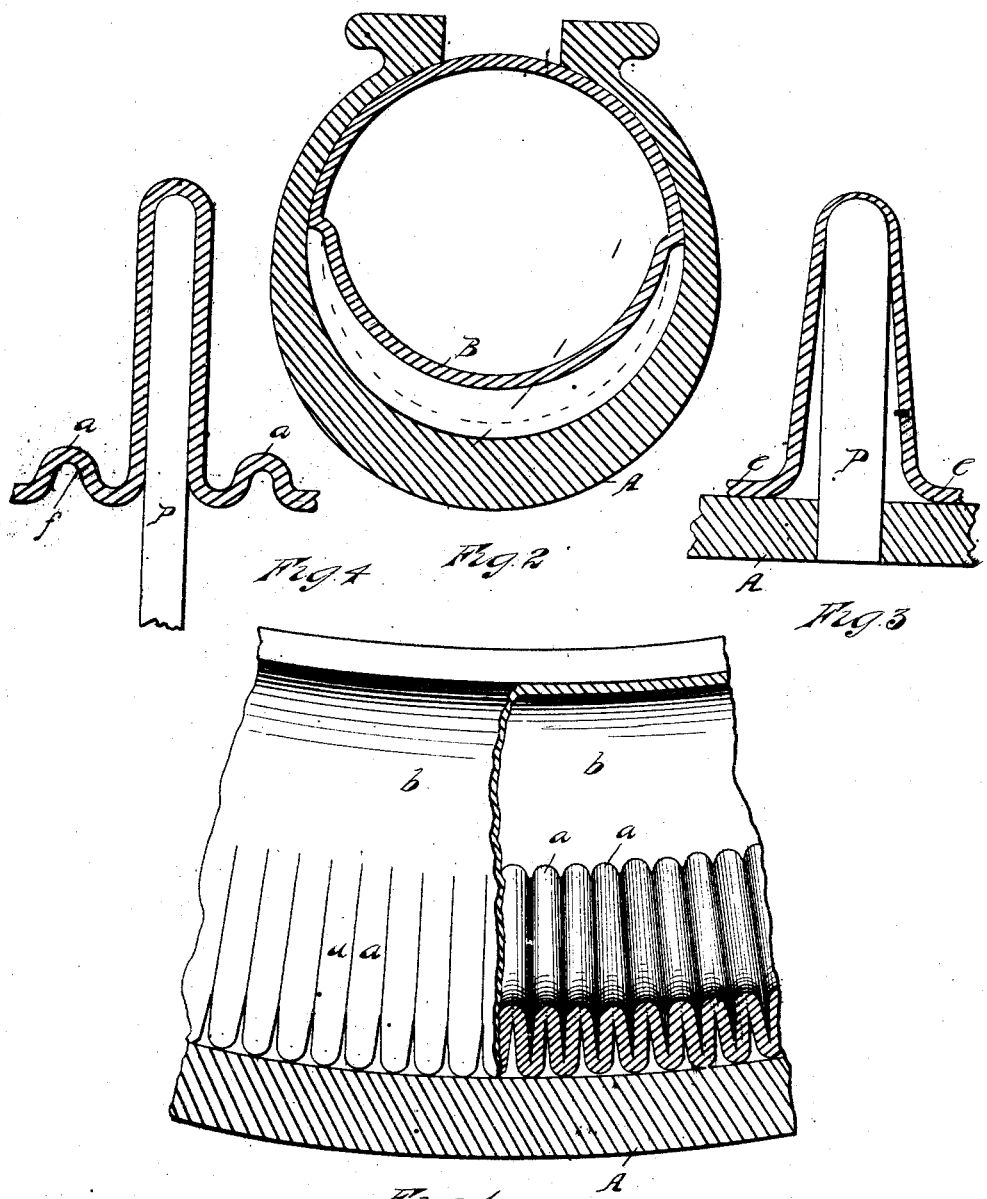
WITNESSES
Clarence E. Day
May E. Kott
INVENTOR
Elon A. Marsh
By Parker & Burton
Attorneys.

UNITED STATES PATENT OFFICE.

ELON A. MARSH, OF DETROIT, MICHIGAN.

PNEUMATIC TIRE.

No. 882,905.  Specification of Letters Patent.  Patented March 24, 1908.

Application filed November 7, 1906. Serial No. 342,331.

*To all whom it may concern:*

Be it known that I, ELON A. MARSH, a citizen of the United States, residing at Detroit, county of Wayne, State of Michigan, have invented a certain new and useful Improvement in Pneumatic Tires, and declare the following to be a full, clear, and exact description of the same, such as will enable others skilled in the art to which it pertains to make and use the same, reference being had to the accompanying drawings, which form a part of this specification.

This invention relates to pneumatic tires; it has for its object an improved tire intended and adapted to prevent puncture by the action of any object or article which may pierce the outer covering of the tire, and press against the inner tube in which the air of the pneumatic cushion is contained, and this object is attained by a form of construction that is entirely in the material of which the tube is made and without guards or sheaths of any extraneous material.

The pneumatic tire which has come most extensively into use is one in which the inner tube of comparatively soft, flexible and elastic material that is impervious to air is contained in, and guarded by an outer tube that is flexible and elastic, and is adapted to withstand the abrading action resulting from the ordinary movements of a wheel along the earth. The two together form the most acceptable cushion device that modern science has applied to vehicle wheels. In this construction, the outer tube, from the nature of the material from which it is constructed, is liable to be pierced or cut through by any sharp article over which the wheel may roll, and the inner tube being strained by the air contained therein is also liable to be punctured by the sharp point of the same article.

It is a well known fact that india rubber, the material of which the tubes are constructed, especially the soft, pliable, flexible and highly elastic rubber of the inner tube affords a considerable resistance to even a sharp pointed article, and will stretch greatly before a sharp pointed article will puncture it, nevertheless, the limit to which it will stretch is reached long before the surface against which the sharp point presses, is forced over against the opposite side of the tube; the air under pressure in the tube tends to prevent the walls of the air containing tube from yielding sufficiently, and the puncture takes place.

In the device in which this invention is embodied, that part of the inner tube which is most liable to puncture is made in folds, and these folds are constructed to furnish ample material to yield before the end of a pointed article pressing against the tube from the outside, and should the pointed article by any chance puncture the tube through one of these folds, the air pressing against the mass of folds tends to compress the rubber edgewise around the opening of the puncture instead of to expand it, and the puncture is thus self closing, and the edges of the hole are so held together that the air does not escape freely from within the contained tube, and unless the puncture be very large, will not escape at all and at all times the presence of other folds on each side of each effects their support in erect radial position.

In the drawings:—Figure 1, is a side elevation of a part of the inner tube, the outer tube being shown in section, and one part of the inner tube being shown in elevation, and one part in section. Fig. 2, is a cross section. Fig. 3, is a diagram indicating the action of a puncturing article against the inner tube now in use. Fig. 4, is a diagram showing the action of an article puncturing the outer tube and pressing against the folds of the inner tube.

Preferably the inner tube should be made to fill without being put under any great tension, the chamber of the outer tube; generally it is made both smaller in diameter and shorter in length, and is expanded by internal pressure against the walls of the outer tube.

In the drawings, A indicates the outer tube which serves to hold the inner tube in place, to cover it and to guard it against abrasion from contact with the earth over which the vehicle travels. Within this tube, which may be of any approved style and construction, I insert an inner tube B, whose outer rim, corresponding to the tread of the outer tube, is made in folds or corrugations *a;* preferably these folds or corrugations should be so deep in extent along a radius of the tube that an object pressing against the tube will force the corrugations to unfold before it begins to stretch the material. The inner rim *b* of this air containing tube is preferably made uncorrugated and in the ordinary form; the corrugations may extend entirely around, but it is a needless extravagance in the use of the rubber and an objectionable addition to the weight of the completed tire to continue the corrugations over a surface that is not liable to be attacked by a puncturing article, and it is sufficient if the corrugations extend to each side of the lower part of the tread for at most half of the distance around the inner tube. They should extend so far that any article pressing against the surface of the inner tube anywhere along the tread half of the tube will open out the folds and furnish a sufficient quantity of material in front of the in-pressing article without straining and stretching the rubber to, or nearly to, its elastic limit.

I have found experimentally that a sheet of rubber punctured in a stretched or strained condition, whether the strain be much or little, increases the size of the puncture and the aperture is larger than the instrument which made it, on the contrary, if a sheet of rubber be compressed edgewise, a puncture existing therein closes up, and it is this law which I have taken advantage of and have formed the rubber of which the inner tube is made with folds that are in a position and relation such that they tend to thicken under the pressure of the air which is contained in the tube. The folds thus formed and arranged may be considered as truss constructions in which the mass of material serves as strut or compression members and the edges or bends of the folds serve as tie members; generally with this construction the tube will yield, instead of being punctured. Should, however, it be punctured by any accident, the pressure of the contained air tends to force the folds outward, and these being resisted by the outer tube, the pressure compresses the rubber edge-wise instead of expanding it, and any cut or puncture through the rubber at this point is automatically closed rather than opened, and especially should there be a tear in the outer tube, the pressure of the inner tube tending to force the folds or rubber into and possibly through the tear, will compress them strongly against one another.

In the diagram shown in Figs. 3 and 4, is represented the action of an article puncturing the outer tire A, and pressing against the inner tire. In case the inner tire be uncorrugated, the point of the in-pressing article forces the rubber in front of it and the pressure of the air which is contained within the sack holds the rubber quite closely to, or quite near to the article which is pressing against the rubber, and the rubber at the points $e$ held against the outer covering A, by the pressure of the included air, are under tension by a force equal to that of the pressure of the air contained in the tube. The rubber under these circumstances can yield before the point of the article P until its elastic limit is reached and then the article P passes through the rubber. When, however, the corrugated tube in which this invention is embodied is acted upon by a puncturing article P, the folds $a$ furnish material which may yield and unfold before the point of the puncturing article P and the elastic limit of the rubber will not be reached until the folds have unfolded. The internal pressure is just as great, but the construction enables the material to yield, and the internal pressure even aids the unfolding when the article assumes the shape shown in Fig. 4, by tending to press the inner angle $f$ outward, and while it holds the material close against the puncturing article, it does not strain it.

What I claim is:—

In a pneumatic tire, in combination with an outer covering, an inner tube adapted to contain air provided with truss-shaped folds extending in close relation, transversely of and partly around the tread side of said inner tube, whereby provision is made for retaining the folds in proper position for yielding before a puncturing article and for pressing the edges of a puncture in one of said folds against each other, substantially as described.

In testimony whereof, I, sign this specification in the presence of two witnesses.

ELON A. MARSH.

Witnesses:
CHARLES F. BURTON,
MAY E. KOTT.